Jan. 30, 1940.   S. J. SHARP   2,188,487
APPARATUS FOR TREATING WATER
Filed Aug. 18, 1938
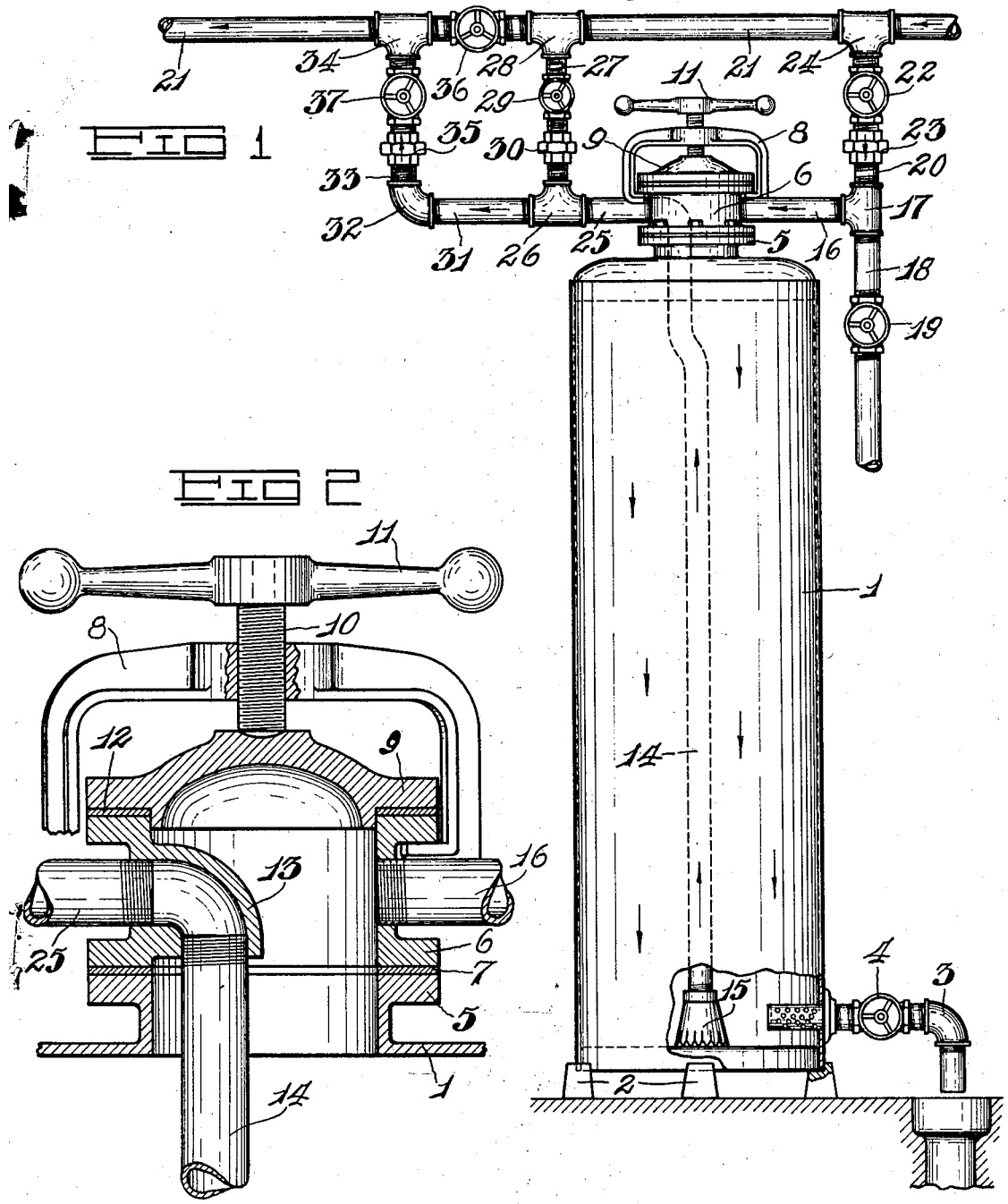
INVENTOR
S. J. Sharp
BY
ATTORNEY Patented Jan. 30, 1940

2,188,487

UNITED STATES PATENT OFFICE 2,188,487

APPARATUS FOR TREATING WATER

Samuel J. Sharp, Wheeling, W. Va., assignor of two-fifths to E. W. Krause, Wheeling, W. Va.

Application August 18, 1938, Serial No. 225,551

2 Claims. (Cl. 210—24)

This invention relates broadly to improvements in water treating apparatus, and more particularly to base exchange water softeners.

One of the objects of the invention is to provide an assembly ring in association with the apparatus whereby the apparatus may be conveniently installed, dismantled, and operated.

Another object of the invention is to provide a plurality of conveniently located valves whereby the softening, regeneration, and backwashing operations of the apparatus may be readily accomplished without the necessity for complicated and intricate valve structures.

Another object of the invention is to provide a base exchange water softening apparatus which is inexpensive to construct and install, and which is efficient in performing its water softening function.

With these and other objects in view, the invention resides in the features of construction, combinations of elements, and arrangement of parts disclosed in the accompanying drawing, in which—

Figure 1 is a side elevational view of the apparatus, a portion of the tank being broken away to illustrate parts located interiorly of said tank; and—

Figure 2 is an enlarged vertical sectional view of the assembly ring illustrating its construction in detail.

Referring to said drawing, the reference numeral 1 designates a cylindrical tank supported by a plurality of feet 2, said tank being designed to contain the granular base exchange silicates or zeolites (not shown). A drain pipe 3 is located adjacent the bottom of the tank and the tank may be drained of water by opening the valve 4.

The top of the tank has an opening defined by an annular flange 5, to which is attached, as by means of bolts or machine screws, an assembly ring 6, a gasket 7 being interposed between the flange 5 of the tank opening and the assembly ring 6. As shown in the drawing, the assembly ring 6 is provided with annular flanges at its upper and lower edges.

The ring is closed by a removable cover 9 and is maintained closed by a yoke clamp 8 adapted to engage the under side of the upper flange of the ring 6. Pressure is exerted on the cover 9 by a screw 10 adapted to be rotated by a handle 11. A gasket 12 is disposed between the cover 9 and the ring 6 to afford a water tight joint.

An elbow 13 is preferably formed integral with the assembly ring 6 at a point in its side wall and has its opposite ends interiorly threaded, the inner end of said elbow receiving the upper end of a tube 14 which is suspended interiorly of the tank at its diametrical center and whose lower end terminates at a spaced distance from the bottom of the tank and accommodates a frusto-conical shaped strainer 15.

The ring 6 at a point diametrically opposite to the elbow 13 is apertured and threaded to receive the inner end of a pipe 16, the outer end of the pipe 16 being connected to a T 17. Extending downwardly from the T 17 is a pipe 18 leading to a drain, the pipe 18 being equipped with a valve 19. Extending upwardly from the T 17 is a pipe 20 leading to a T 24 in the water service line 21, the pipe 20 being equipped with a valve 22 and a connecting union 23.

Threadedly received in the outer end of the elbow 13 is the inner end of a pipe 25, the outer end of which is connected to a T 26. Extending vertically from the T 26 is a pipe 27 leading to a T 28 in the water service line 21, the pipe 27 being equipped with a valve 29 and a connecting union 30.

Extending horizontally from the T 26 is a pipe 31 connected to an L 32, which latter is connected to a vertically disposed pipe 33 leading to a T 34 in the water service line 21, the pipe 33 being equipped with a valve 37 and a connecting union 35.

A valve 36 is disposed between the T 34 and the T 28 in the service line 21.

During the water softening operation, valves 4, 19, 29 and 36 are closed, and valves 22 and 37 are open. Thus, as shown by the arrows in Figure 1 of the drawing, untreated water from the service line flows through the pipes 20 and 16 into the ring 6, whence it is precipitated downwardly through the base exchange silicates or zeolites in the treating chamber to the bottom of the tank 1; thence flows upwardly through the tube 14, elbow 13, pipes 25, 31 and 33 delivering treated or softened water to the service line 21 supplying the premises where installed.

After a period of operation, the treating chamber will accumulate objectionable foreign matter or impurities which are removed by a process known in the art as backwashing in which the normal direction of flow of the water through the treating chamber is reversed, and the water and objectionable matter conducted to a sewer or drain. In the present apparatus backwashing is accomplished by closing all valves with the exception of valves 29 and 19. Thus, water from the service line 21 will flow only through pipes 27 and 25 into the treating chamber through the tube 14, whence the flow is upwardly through the softening mineral agent and outwardly of the tank 1 through pipes 16 and 18. The backwashing operation is continued until such time as all undesirable matter has been cleansed from the treating chamber.

Base exchange silicates and zeolites after a period of use become ineffectual and regeneration becomes necessary to regenerate the same to restore their base exchange properties. This is ordinarily accomplished by rinsing the silicates or zeolites with salt water.

Regeneration is accomplished in the following manner with the apparatus: All valves, except valve 4, are closed, valve 4 being opened to release the pressure in the treating chamber. The cover 9 is removed and an appropriate quantity of salt introduced in the tank through the ring 6, after which the cover is replaced and again clamped in place. Valve 22 is then opened to permit water to flow through pipes 20 and 16 into the tank, where it dissolves the salt. The salt water then passed downwardly over the silicates or zeolites to regenerate the same, after which it makes its exit through the drain 3 into a sewer. The regeneration operation is continued until such time as complete regeneration takes place and the water emanating from the drain pipe 3 is free of salt. If desired, valve 36 may be kept open during regeneration so as to keep a supply of untreated water in the line servicing the premises.

It will be noted that the entire system is connected to the assembly ring so that the assembling and installation is simple. Moreover the unions 35, 30 and 23 are in alignment and dismantling or removal of the apparatus requires only that these three conveniently located unions be disconnected. All of the valves are readily accessible, and their manipulation to effect any of the various operations is exceedingly simple.

What is claimed is—

1. In a water treating apparatus, a tank having an opening, a flange surrounding the opening, a member of substantially ring-like form having upper and lower flanges, the latter secured to the tank flange, said member having a threaded opening extending through its side and having an elbow formed integral therewith and merging thereinto and located in spaced relation to the opening, the end portions of the elbow being threaded and one end portion thereof being in register with a second opening provided therefor in the side of the member, a tube in the tank threaded into engagement with the other end portion of the elbow, a pipe threadedly connected to the first named threaded opening of the member, a pipe threadedly connected to the first named end portion of the elbow, a closure seated on the upper flange of the member, and means to removably connect the closure to the said upper flange of the member.

2. In a water treating apparatus, a tank having an opening, an open-centered one-piece member, means to secure the member to the tank with its open center alined with the tank opening, said member having an opening extending through a side thereof, a pipe threaded into engagement with the said opening of the member, an elbow integral with and merging into the member and having one end in register with a second opening provided therefor in the member and spaced from the first opening of the member, a pipe threaded into engagement with said last named opening, a pipe in the tank threadedly engaged in the other end of the elbow, a cover for the member, and means to secure the cover in position.

SAMUEL J. SHARP.